(12) United States Patent
Mizuno et al.

(10) Patent No.: US 12,253,167 B2
(45) Date of Patent: Mar. 18, 2025

(54) SYSTEM AND METHOD FOR CONTROLLING POWER TRANSMISSION MECHANISM, AND UTILITY VEHICLE

(71) Applicant: KAWASAKI MOTORS, LTD., Hyogo (JP)

(72) Inventors: Masahiro Mizuno, Kobe (JP); Shohei Mizuishi, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 141 days.

(21) Appl. No.: 18/089,193

(22) Filed: Dec. 27, 2022

(65) Prior Publication Data

US 2024/0209937 A1 Jun. 27, 2024

(51) Int. Cl.
*F16H 63/18* (2006.01)
*F16H 63/30* (2006.01)

(52) U.S. Cl.
CPC ..... *F16H 63/18* (2013.01); *F16H 2063/3093* (2013.01)

(58) Field of Classification Search
CPC .. F16H 63/18; F16H 2063/3093; F16H 61/30; F16H 61/688; F16H 63/3026; F16H 63/32; F16H 2200/0056; F16H 2200/006; F16H 3/006

USPC .................................................. 74/330, 664
See application file for complete search history.

(56) References Cited

U.S. PATENT DOCUMENTS

| 8,082,817 | B2 | 12/2011 | Takahara et al. |
| 9,038,493 | B2* | 5/2015 | Iwasaki ................ F16D 48/06 74/335 |
| 9,377,102 | B2* | 6/2016 | Yoshimura ............ F16H 61/12 |

* cited by examiner

*Primary Examiner* — Victor L Macarthur
(74) *Attorney, Agent, or Firm* — Wenderoth, Lind & Ponack, L.L.P.

(57) ABSTRACT

A system includes a power transmission mechanism having a rotation shaft, a power transmission gear, a dog ring, a dog clutch, a switching mechanism to move the dog ring in an axial direction to switch a power transmission state, and a switching controller to control an operation of the switching mechanism. The switching controller determines whether the dog clutch is in an engaged state when giving a switching command to cause the dog ring to be moved to a side of the power transmission gear in the axial direction. After the dog clutch is determined not to be in the engaged state, the switching controller causes the dog ring to be moved to the side opposite to the power transmission gear, and then retries movement of the dog ring to the side of the power transmission gear.

10 Claims, 11 Drawing Sheets

SYSTEM AND METHOD FOR CONTROLLING POWER TRANSMISSION MECHANISM, AND UTILITY VEHICLE

BACKGROUND OF THE INVENTION

The present invention relates to a system and a method for controlling a power transmission mechanism, and a utility vehicle equipped with such a system.

U.S. Pat. No. 8,082,817 B2 discloses a power transmission mechanism having a plurality of dog clutches. When a certain dog clutch is switched from a non-engaged state to an engaged state, a dog claw may not be fitted into an engagement hole, and the non-engaged state of the dog clutch may be continued.

SUMMARY OF THE INVENTION

An object of the present invention is to prevent continuation of a non-engaged state of a dog clutch.

A first aspect of the present invention provides a system for controlling a power transmission mechanism. The system includes: a power transmission mechanism including a rotation shaft; a power transmission gear rotatably fitted to the rotation shaft and locked to the rotation shaft in an axial direction; a dog ring fitted to the rotation shaft so as to be slidable in the axial direction and locked to the rotation shaft in a circumferential direction; and a dog clutch provided in the dog ring and the power transmission gear, a switching mechanism that moves the dog ring in the axial direction to switch a power transmission state, and a switching controller that controls operation of the switching mechanism. The switching controller determines whether the dog clutch becomes in an engaged state in a case of giving a switching command for switching the power transmission state by moving the dog ring to the power transmission gear side in the axial direction, and causes the dog ring to be moved to a side opposite to the power transmission gear side in the axial direction in a case where the dog clutch is determined not to be in the engaged state, and then retries movement of the dog ring to the power transmission gear side.

A second aspect of the present invention provides a method for controlling a power transmission mechanism including a rotation shaft, a power transmission gear rotatably fitted to the rotation shaft and locked to the rotation shaft in an axial direction, a dog ring fitted to the rotation shaft so as to be slidable in the axial direction and locked to the rotation shaft in a circumferential direction, and a dog clutch provided in the dog ring and the power transmission gear. The method includes the steps of determining whether the dog clutch becomes in an engaged state in a case where a switching command for switching a power transmission state by moving the dog ring to the power transmission gear side in the axial direction is given, and causing the dog ring to be moved to a side opposite to the power transmission gear side in the axial direction in a case where the dog clutch is determined not to be in the engaged state, and then retrying movement of the dog ring to the power transmission gear side.

A third aspect of the present invention provides a utility vehicle including a rotation shaft, a power transmission gear rotatably fitted to the rotation shaft and locked to the rotation shaft in an axial direction, a dog ring fitted to the rotation shaft so as to be slidable in the axial direction and locked to the rotation shaft in a circumferential direction, a dog clutch provided in the dog ring and the power transmission gear, a shift member that is engaged with the dog ring and moves the dog ring in the axial direction, and a controller that controls movement of the shift member. The controller determines whether the dog clutch becomes in an engaged state in a case of giving a switching command for switching a power transmission state by moving the dog ring to the power transmission gear side in the axial direction, and causes the dog ring to be moved to a side opposite to the power transmission gear side in the axial direction in a case where the dog clutch is determined not to be in the engaged state, and then retries movement of the dog ring to the power transmission gear side.

According to the above configuration, when the dog clutch is determined not to be in the engaged state at the time of switching of the power transmission state, the dog ring temporarily moves to the side opposite to the power transmission gear side, and then moves again to the power transmission gear side. By allowing this retry to be automatically performed, it is possible to prevent continuation of a non-engaged state of the dog clutch even in a case where the dog clutch is not engaged at the time of switching of the power transmission state.

DETAILED DESCRIPTION OF THE EMBODIMENTS

Figure 1:
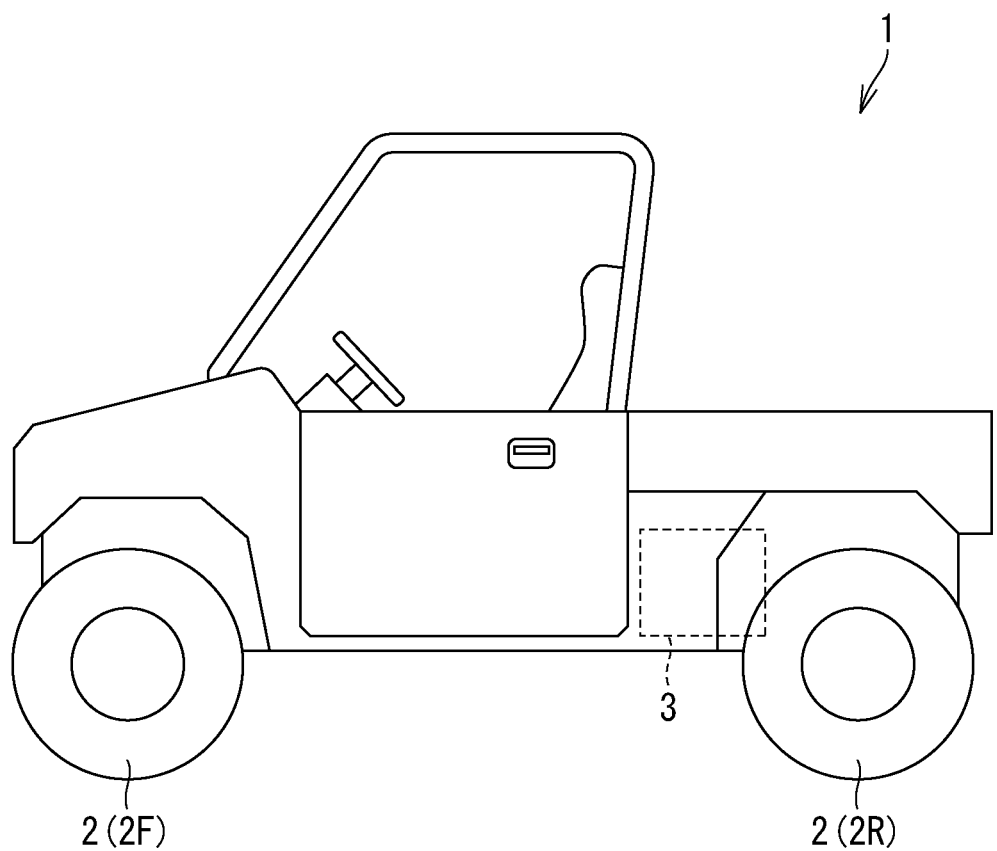
FIG. 1 is a side view of a utility vehicle according to an embodiment.

An embodiment will be described with reference to the drawings. Note that the same or corresponding elements are denoted by the same reference numerals throughout the drawings, and overlapping of detailed description will be omitted.

Figure 2:
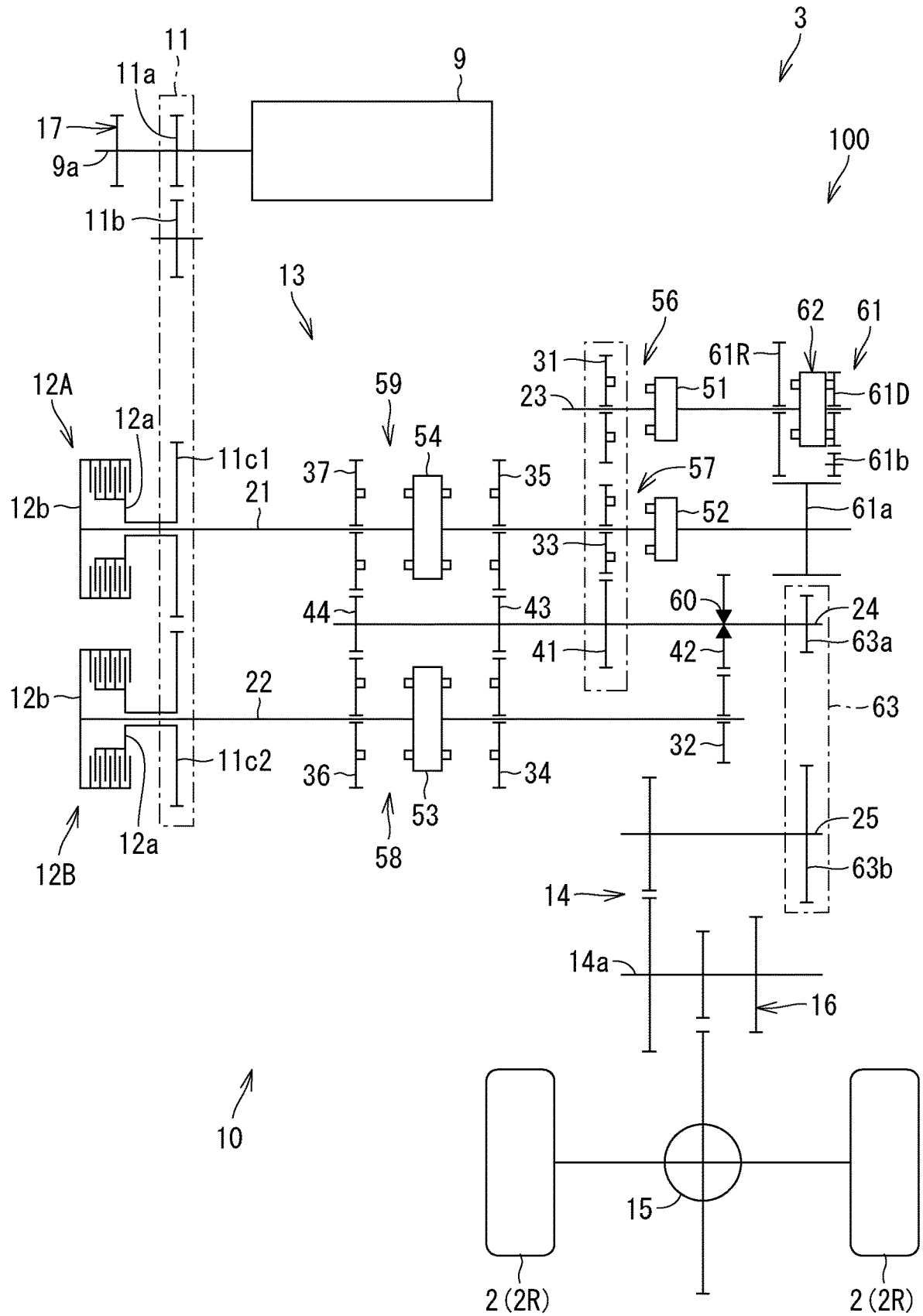
FIG. 2 is a skeleton diagram of a power unit.

FIG. 1 illustrates a utility vehicle 1 as an example of a vehicle equipped with a control system 100 (see FIG. 4) of a power transmission mechanism 10 (see FIG. 2). The utility vehicle 1 includes four wheels 2 including left and right front wheels 2F and left and right rear wheels 2R, and a power unit 3 that drives the wheels 2. The power unit 3 is arranged between the front wheel 2F and the rear wheel 2R in a vehicle length direction.

Referring to FIG. 2, the power unit 3 includes a drive source 9 and the power transmission mechanism 10. The drive source 9 generates power for rotating the wheel 2. The drive source 9 is, for example, an engine. The drive source 9 may include an electric motor instead of or in addition to an engine. The engine has, as a drive source output shaft 9a, a crankshaft that is rotationally driven in accordance with combustion of an air-fuel mixture containing fuel.

The power transmission mechanism 10 transmits power generated by the drive source 9 to the wheel 2. The power transmission mechanism 10 includes a primary reduction mechanism 11, clutches 12A and 12B, a transmission 13, a final reduction mechanism 14, a rear differential mechanism 15, and a power distribution unit 16. In the present embodiment, the two clutches 12A and 12B are interposed between the drive source 9 and the transmission 13, and the transmission 13 is a dual clutch transmission (DCT).

The primary reduction mechanism 11 transmits rotation of the drive source output shaft 9a to each input element 12a of the clutches 12A and 12B, and decelerates the rotation in the process. In the primary reduction mechanism 11, an intermediate gear 11b is meshed with the driving gear 11a fixed on the drive source output shaft 9a. The intermediate gear 11b is also meshed with a first driven gear 11c1 fixed to the input element 12a of the first clutch 12A and a second driven gear 11c2 fixed to the input element 12a of the second clutch 12B.

A state of each of the clutches 12A and 12B is switched between an engaged state in which rotation of the input element 12a is transmitted to an output element 12b and a released state in which the input element 12a and the output element 12b are disconnected from each other. A type of the clutches 12A and 12B is not particularly limited, and is, for example, a multiple plate friction clutch of a hydraulic drive system.

The transmission 13 includes, as an example of a rotation shaft, a first input shaft 21, a second input shaft 22, a low shaft 23, a counter shaft 24, and an output shaft 25. The output elements 12b of the first and second clutches 12A and 12B are fixed onto the first and second input shafts 21 and 22, respectively. Each of the first and second input shafts 21 and 22 rotates integrally with a corresponding one of the output elements 12b unless the corresponding clutches 12A and 12B are in the released state. The transmission 13 outputs rotation of the first or second input shaft 21 or 22 to the output shaft 25.

The transmission 13 selectively sets one gear position from a plurality of (for example, seven) forward positions and one or more (for example, one) reverse positions. A power transmission path in the transmission 13 from the input shafts 21 and 22 to the output shaft 25 is switched according to a gear position, and thereby, rotation of the first or second input shaft 21 or 22 is changed in speed at a gear ratio according to a gear position before being output to the output shaft 25. Note that the transmission 13 may also be capable of selecting, as one of gear positions, a neutral position at which a power transmission path between the input shafts 21 and 22 and the output shaft 25 is disconnected.

The final reduction mechanism 14 decelerates rotation of the output shaft 25. The rear differential mechanism 15 distributes the rotation decelerated by the final reduction mechanism 14 to the left and right rear wheels 2R. The power distribution unit 16 distributes the rotation decelerated by the final reduction mechanism 14 to the left and right front wheels 2F (see FIG. 1). Note that FIG. 2 illustrates only a gear provided on the final shaft 14a constituting the final reduction mechanism 14 in the power distribution unit 16. In the present embodiment, all the four wheels 2 are drive wheels to which power from the drive source 9 is transmitted by the power transmission mechanism 10.

Switching of a power transmission state (at least switching of a state of each of the clutches 12A and 12B and switching of a gear position set to the transmission 13) in the power transmission mechanism 10 is automatically performed without manual operation by the driver. A switching timing is determined by electronic control. The switching operation is performed by using hydraulic pressure, and the hydraulic pressure is adjusted by electronic control.

In addition to the rotation shafts 21 to 25 described above, the transmission 13 includes a plurality of power transmission gears 31 to 37 and 41 to 44, a plurality of dog rings 51 to 54, a plurality of dog clutches 56 to 59, a one-way clutch 60, a bypass gear 61, a forward and reverse selector 62, and an output gear 63. The rotation shafts 21 to 25 are parallel to each other and extend, for example, in a vehicle width direction. A plurality of the power transmission gears 31 to 37 and 41 to 44, the bypass gear 61, and the output gear 63 are parallel shaft gears that are constantly meshed, and transmit power between two shafts of the rotation shaft 21 to 25.

The bypass gear 61 includes an upstream gear 61a fixed on the first input shaft 21, and first and second downstream gears 61D and 61R provided on the low shaft 23 so as to be relatively rotatable and arranged in an axial direction. The idle gear 61b is interposed between the first downstream gear 61D and the upstream gear 61a, while the second downstream gear 61R directly meshes with the upstream gear 61a. The first downstream gear 61D rotates in the same forward direction as the first and second input shafts 21 and 22, and the second downstream gear 61R rotates in a reverse direction opposite to the forward direction. The forward and reverse selector 62 includes a sleeve arranged between the downstream gears 61D and 61R in the axial direction. The sleeve is displaceable in the axial direction between a forward position where the sleeve is engaged with the first downstream gear 61D and a reverse position where the sleeve is engaged with the second downstream gear 61R, and rotates integrally with the low shaft 23. Hereinafter, unless otherwise specified, the sleeve is at the forward position, rotation of the first input shaft 21 is transmitted to the low shaft 23 via the first downstream gear 61D, and the low shaft 23 rotates in the forward direction. The output gear 63 includes an upstream gear 63a fixed on the counter shaft 24 and a downstream gear 63b fixed on the output shaft 25 and meshing with the upstream gear 63a, and decelerates rotation of the counter shaft 24 and transmits the rotation to the output shaft 25.

The power transmission gear includes a first to seventh gear driving gears 31 to 37 and low gear, second gear, middle gear, and high gear driven gears 41 to 44. The first gear driving gear 31 is provided on the low shaft 23, the third, fifth, and seventh gear driving gears 33, 35, and 37 are provided on the first input shaft 21, and the second, fourth, and sixth gear driving gears 32, 34, and 36 are provided on the second input shaft 22. The driven gears 41 to 44 are provided on the counter shaft 24. Each of the driving gears 31 to 37 constantly meshes with any of the driven gears 41 to 44. The first and third gear driving gears 31 and 33 mesh with the low gear driven gear 41, the second gear driving gear 32 meshes with the second gear driven gear 42, the fourth and fifth gear driving gears 34 and 35 mesh with the middle gear driven gear 43, and the sixth and seventh gear driving gears 36 and 37 mesh with the high gear driven gear 44.

The second gear driving gear 32 is fixed on the second rotation shaft 22 and rotates integrally with the second rotation shaft 22. The other ones, the driving gears 31 and 33 to 37, are rotatably fitted to a corresponding rotation shaft (for example, the first input shaft 21, the second input shaft 22, or the low shaft 23) in the axial direction, and are locked to the rotation shaft in the axial direction. For example, each of the driving gears 31 and 33 to 37 is supported on an outer peripheral surface of the corresponding rotation shaft via a bearing such as a needle bearing so as to be relatively rotatable with respect to the corresponding rotation shaft. Each of the driving gears 31 and 33 to 37 is held on an outer peripheral surface of the corresponding rotation shaft by a holder such as a snap ring so as not to be displaced in the axial direction. Note that the downstream gears 61D and 61R may be configured in the same manner. The second gear driven gear 42 is supported on the counter shaft 24 via the one-way clutch 60. The other driven gears 41, 43, and 44 are fixed on the counter shaft 24 and rotate integrally with the counter shaft 24.

Each of the dog rings 51 to 54 is slidably fitted to a corresponding rotation shaft (for example, the first input shaft 21, the second input shaft 22, or the low shaft 23) in the axial direction, and is locked to the rotation shaft in a circumferential direction. For example, each of the dog rings 51 to 54 is spline-fitted to a corresponding rotation shaft, and, in this manner, displaceable in the axial direction along a spline groove, and engages with the rotation shaft in the circumferential direction at the spline groove to rotate integrally with the rotation shaft. Note that the sleeve of the forward and reverse selector 62 may be configured in the same manner.

Each of the dog clutches 56 to 59 is provided on one of the dog rings 51 to 54 and one or two power transmission gears (in particular, the driving gears 31 and 33 to 37) adjacent to one of the dog rings 51 to 54 in the axial direction.

The first dog clutch 56 is provided on the first dog ring 51 provided on the low shaft 23 and the first gear driving gear 31 adjacent to the first dog ring 51 in the axial direction. The second dog clutch 57 is provided on the second dog ring 52 provided on the first input shaft 21 and the third gear driving gear 33 adjacent to the second dog ring 52 in the axial direction. The position in the axial direction of the first dog ring 51 is switched between two positions, that is, an engaged position at which the first dog ring 51 is engaged with the first gear driving gear 31 and a neutral position away from the first gear driving gear 31. The second dog ring 52 is also of this two-position type. FIG. 2 illustrates a state in which the first and second dog rings 51 and 52 are at the neutral positions.

The third dog clutch 58 is provided on the third dog ring 53 provided on the second input shaft 22 and the fourth and sixth gear driving gears 34 and 36 sandwiching the third dog ring 53 in the axial direction. The fourth dog clutch 59 is provided on the fourth dog ring 54 provided on the first input shaft 21 and the fifth and seventh gear driving gears 35 and 37 sandwiching the fourth dog ring 54 in the axial direction. The position in the axial direction of the third dog ring 53 is switched between three positions, that is, a first engaged position at which the third dog ring 53 engages with the fourth gear driving gear 34 on the relatively low gear side, a second engaged position at which the third dog ring 53 engages with the sixth gear driving gear 36 on the relatively high gear side, and a neutral position between the two engaged positions and away from any of the driving gears 34 and 36. The fourth dog ring 54 is also of this three-position type. FIG. 2 illustrates a state in which the third and fourth dog rings 53 and 54 are at the neutral positions.

In the dog clutches 56 and 57 of the two-position type, two elements form a set for engagement between the dog rings 51 and 52 and the power transmission gears 31 and 33, and are provided separately on opposing surfaces of the dog rings 51 and 52 and opposing surfaces of the power transmission gears 31 and 33. This engagement set may be composed of two elements of a dog tooth and a dog tooth. In this case, the dog teeth are provided on both the opposing surfaces of the dog rings 51 and 52 and the opposing surfaces of the power transmission gears 31 and 33. The engagement set may be composed of two elements of a dog tooth and an engagement hole. In this case, the dog tooth is provided on one of the opposing surfaces of the dog rings 51 and 52 and the opposing surfaces of the power transmission gears 31 and 33, and the engagement hole is provided on the other. When the dog rings 51 and 52 are in the engaged position, the two elements are engaged with each other, and the dog clutches 56 and 57 are in an engaged state in which rotation of the dog rings 51 and 52 is transmitted to the power transmission gears 31 and 33. When the two elements are a dog tooth and a dog tooth, the dog teeth mesh with each other in the engaged state. When the two elements are a dog tooth and an engagement hole, in the engaged state, the dog tooth fits into the engagement hole. When the dog rings 51 and 52 are in the neutral positions, the two elements are released from each other in the axial direction, and the dog clutches 56 and 57 are brought into a non-engaged state in which rotation of the dog rings 51 and 52 cannot be transmitted to the power transmission gears 31 and 33. The dog clutches 58 and 59 of the three-position type are also configured similarly to the dog clutches of the two-position type except that a constituent of the engagement set is provided on both side surfaces of the dog rings 53 and 54.

In the transmission 13, all the dog clutches 56 to 59 are brought into the non-engaged state, or one of the dog clutches 56 to 59 is brought into the engaged state. By the above, rotation decelerated by the primary reduction mechanism 11 is transmitted to the counter shaft 24 via any one of the first to seventh gear driving gears 31 to 37.

At a first gear position, the first dog clutch 56 is in the engaged state, the other dog clutches 57 to 59 are in the non-engaged state, the first clutch 12A is in the engaged state, and the second clutch 12B is in the released state. Rotation of the first input shaft 21 is transmitted to the counter shaft 24 via the bypass gear 61, the sleeve at the forward position, the low shaft 23, the first dog ring 51, the first dog clutch 56, the first gear driving gear 31, and the low gear driven gear 41.

At a second gear position, all the dog clutches 56 to 59 are in the non-engaged state, the second clutch 12B is in the engaged state, and the first clutch 12A is in the released state. Rotation of the second input shaft 22 is transmitted to the counter shaft 24 via the second gear driving gear 32, the second gear driven gear 42, and the one-way clutch 60. Note that, at even-numbered gear positions (fourth gear position and sixth gear position) other than the second gear position, the second gear driven gear 42 idles due to an action of the one-way clutch 60.

At a third gear position, the second dog clutch 57 is in the engaged state, the other dog clutches 56, 58, and 59 are in the non-engaged state, the first clutch 12A is in the engaged state, and the second clutch 12B is in the released state. Rotation of the first input shaft 21 is transmitted to the counter shaft 24 via the second dog ring 52, the second dog clutch 57, the third gear driving gear 33, and the low gear driven gear 41.

At a fourth gear position, the third dog clutch 58 is in the engaged state at the first engaged position, the other dog clutches 56, 57, and 59 are in the non-engaged state, the second clutch 12B is in the engaged state, and the first clutch 12A is in the released state. Rotation of the second input shaft 22 is transmitted to the counter shaft 24 via the third dog ring 53, the third dog clutch 58, the fourth gear driving gear 34, and the middle gear driven gear 43.

At a fifth gear position, the fourth dog clutch 59 is in the engaged state at the first engaged position, the other dog clutches 56 to 58 are in the non-engaged state, the first clutch 12A is in the engaged state, and the second clutch 12B is in the released state. Rotation of the first input shaft 21 is transmitted to the counter shaft 24 via the fourth dog ring 54, the fourth dog clutch 59, the fifth gear driving gear 35, and the middle gear driven gear 43.

At a sixth gear position, the third dog clutch 58 is in the engaged state at the second engaged position, the other dog clutches 56, 57, and 59 are in the non-engaged state, the second clutch 12B is in the engaged state, and the first clutch 12A is in the released state. Rotation of the second input shaft 22 is transmitted to the counter shaft 24 via the third dog ring 53, the third dog clutch 58, the sixth gear driving gear 36, and the high gear driven gear 44.

At a seventh gear position, the fourth dog clutch 59 is in the engaged state at the second engaged position, the other dog clutches 56 to 58 are in the non-engaged state, the first clutch 12A is in the engaged state, and the second clutch 12B is in the released state. Rotation of the first input shaft 21 is transmitted to the counter shaft 24 via the fourth dog ring 54, the fourth dog clutch 59, the seventh gear driving gear 37, and the high gear driven gear 44.

At odd-numbered gear positions of the first gear position, the third gear position, the fifth gear position, and the seventh gear position, the first clutch 12A is in the engaged state, and rotation of the first input shaft 21 is transmitted to the counter shaft 24. At even-numbered gear positions of the second gear position, the fourth gear position, and the sixth gear position, the second clutch 12B is in the engaged state, and rotation of the second input shaft 22 is transmitted to the counter shaft 24.

The first input shaft 21 is an odd-numbered shaft forming a power transmission path of an odd-numbered gear position. The second input shaft 22 is an even-numbered shaft forming a power transmission path of an even-numbered gear position. Switching of the power transmission state (that is, gear position) includes shift-up for increasing the ordinal number of a gear position to decrease a reduction ratio and shift-down for decreasing the ordinal number of a gear position to increase a reduction ratio. In both shift-up and shift-down, in principle, the ordinal number changes by one. In other words, the switching of the power transmission state (that is, gear position) is, in principle, switching between a state in which rotation of an odd-numbered shaft (the first input shaft 21) is transmitted to the counter shaft 24 and a state in which rotation of an even-numbered shaft (the second input shaft 22) is transmitted to the counter shaft 24. In this switching, a state of the dog clutches 56 to 59 (that is, the position in the axial direction of the dog rings 51 to 54) is switched.

Hereinafter, under a situation where a power transmission state is about to be switched from one gear position to another gear position, the gear position set before the switching is referred to as a "pre-switching gear position", and the gear position to be set after the switching is referred to as a "target gear position". Unless otherwise specified, the target gear position is a gear position on the higher gear side by one gear (for example, fourth gear position) or a gear position on the lower gear side by one gear (for example, second gear position) from the pre-switching gear position (for example, third gear position).

Hereinafter, a dog clutch corresponding to the "pre-switching gear position" is referred to as a "pre-switching dog clutch", a dog ring constituting the pre-switching dog clutch is referred to as a "pre-switching dog ring", and a power transmission gear constituting the pre-switching dog clutch is referred to as a "pre-switching gear". For example, in a case where the pre-switching gear position is the third gear position, the second dog clutch 57, the second dog ring 52, and the third gear driving gear 33 are the pre-switching dog clutch, the pre-switching dog ring, and the pre-switching gear, respectively.

Hereinafter, a dog clutch corresponding to the "target gear position" is referred to as a "target dog clutch", a dog ring constituting the target dog clutch is referred to as a "target dog ring", and a power transmission gear constituting the target dog clutch is referred to as a "target gear". For example, as illustrated in FIGS. 6A to 6D, in a case where the target gear position is the fourth gear position, the third dog clutch 58, the third dog ring 53, and the fourth gear driving gear 34 are a target dog clutch 55, a target dog ring 50, and a target gear 30, respectively.

In a transition period from unsetting of the pre-switching gear position to completion of setting of the target gear position, the position in the axial direction of the target dog ring 50 is in a process of being displaced from the neutral position to the engaged position, and the target dog clutch 55 is in the non-engaged state. The control system 100 determines whether or not transition to the target gear position has been appropriately completed, and if the transition is not completed (that is, in a case where the target dog clutch 55 is not brought into the engaged state), the operation for transition to the target gear position is retried. The continuation of the non-engaged state of the target dog clutch 55 can be prevented as a result by retrying rather than by leaving the target dog clutch 55 in the state of not being in the engaged state, and by the above, prolongation of the transition period can be prevented.

Note that, as an example of a situation in which the target dog clutch 55 is not brought into the engaged state, a situation in which tips of dog teeth collide with each other in the axial direction in a case where the two elements of the engagement set are a dog tooth and a dog tooth, and a situation in which a rotational speed difference between the target dog ring 50 and the target gear 30 is small can be exemplified. Under this situation, the dog teeth hardly overlap each other in the axial direction, and hardly mesh with each other in the circumferential direction. In the present embodiment, a synchromesh mechanism is omitted from the transmission 13, so that simplification of a configuration of the transmission 13 is achieved. Even without a synchromesh mechanism, continuation of the non-engaged state of the target dog clutch 55 is prevented.

Figure 3A:
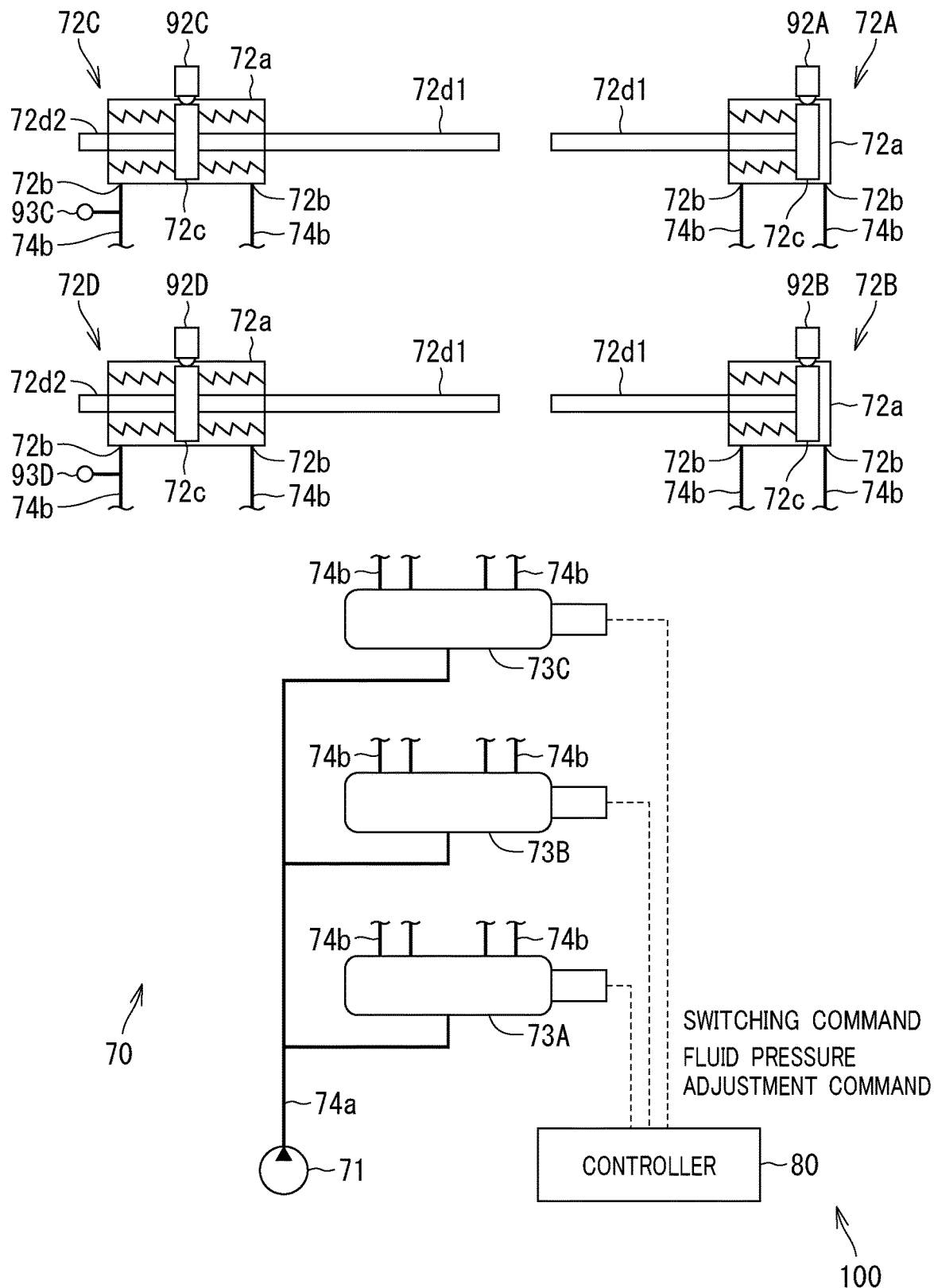
FIGS. 3A and 3B are schematic diagrams of a switching mechanism.
Figure 3B:
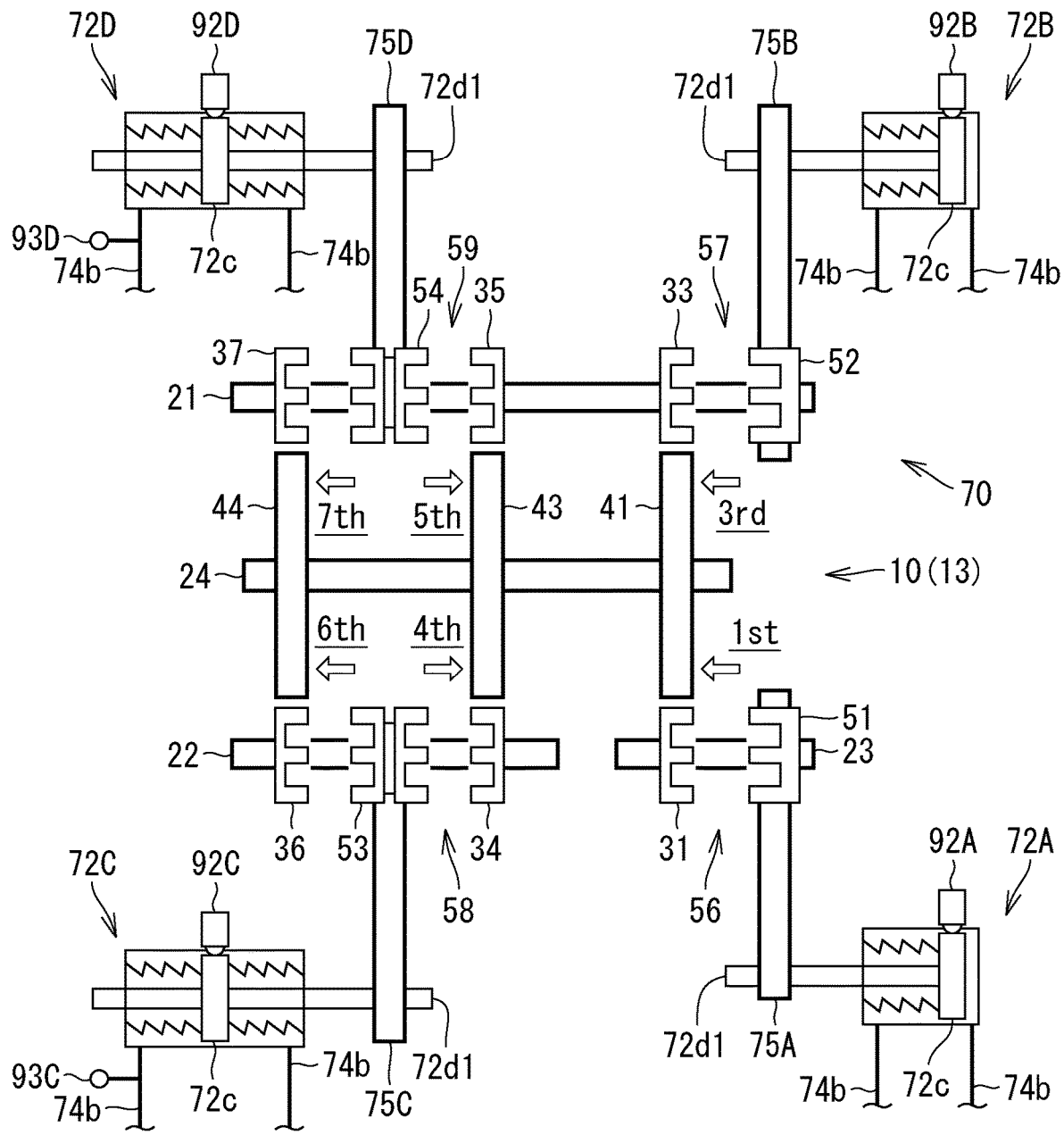
Figure 4:
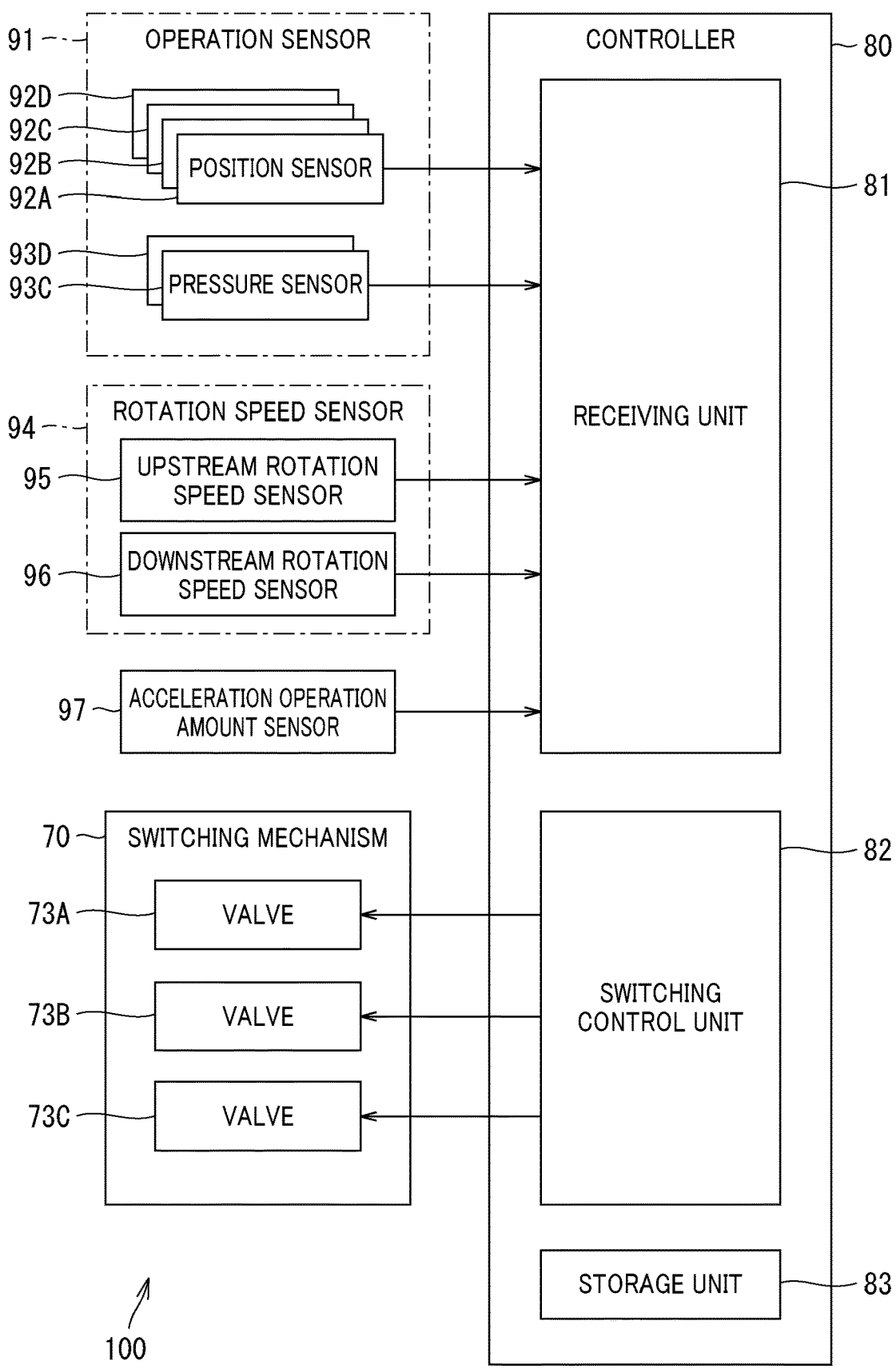
FIG. 4 is a block diagram of a control system.

As illustrated in FIGS. 3A, 3B, and 4, the control system 100 includes a switching mechanism 70 and a controller 80 in addition to the power transmission mechanism 10 described above. The switching mechanism 70 moves the dog rings 51 to 54 in the axial direction to switch a power transmission state. A processor of the controller 80 functions as a switching controller 82 that controls operation of the switching mechanism 70.

Referring to FIGS. 3A and 3B, the switching mechanism 70 includes a pump 71 that supplies hydraulic pressure, cylinders 72A to 72D that operate according to hydraulic pressure supplied by the pump 71, valves 73A to 73C that control supply and discharge of pressure oil to and from the cylinders 72A to 72D, and shift members 75A to 75D driven by the cylinders 72A to 72D. The pump 71 is single. The cylinders 72A to 72D and the shift members 75A to 75D are provided as many as the dog rings 51 to 54 (for example, four), and correspond to the dog rings 51 to 54 on a one-to-one basis. A plurality (for example, three) of the valves 73A to 73C are provided.

A gear 17 (see FIG. 2) for driving an auxiliary machine is provided on the drive source output shaft 9a or any shaft constituting the power transmission mechanism 10. The pump 71 is driven by power extracted from the gear 17. Each of the valves 73A to 73C is connected to a discharge port of the pump 71 via a pump line 74a, and is connected to a port 72b of the cylinders 72A to 72D via a control line 74b. The valves 73A to 73C are electromagnetic valves that operate in accordance with a switching command given from the controller 80. The "switching command" is a control command output from the controller 80 to the switching mechanism 70 to displace the position in the axial direction of the target dog ring 50 from the neutral position to the engaged position, and more specifically, is an electric signal that excites or demagnetizes a solenoid of the valves 73A to 73C as electromagnetic valves. The valves 73A to 73C may be linear solenoid valves, and a current value of the electric signal may be variably set.

Each of the cylinders 72A to 72D includes a cylinder body 72a, a port 72b, a piston 72c, and an operation rod 72d1. The piston 72c partitions the inside of the cylinder body 72a into two oil chambers. Each of the cylinders 72A to 72D is of a double-acting type, and two of the ports 72b communicate with two oil chambers. The operation rod 72d1 extends in a cylinder axial direction. A proximal end of the operation rod 72d1 is fixed to a first end surface of the piston 72c, and a distal end of the operation rod 72d1 protrudes to the outside of the cylinder body 72a. The shift members 75A to 75D are fixed to the distal end of the operation rod 72d1 and engage with an outer peripheral surface of the corresponding dog rings 51 to 54. The cylinder axial direction is parallel to the axial direction of the rotation shafts 21 to 25. As supply and discharge of pressure oil to and from two oil chambers are controlled, the operation rod 72d1 moves in the axial direction together with the piston 72c and the corresponding shift members 75A to 75D, and the corresponding dog rings 51 to 54 are displaced in the axial direction.

The first and second cylinders 72A and 72B correspond to the first and second dog rings 51 and 52 of the two-position type, respectively, and are of a single-rod type. When the piston 72c of the cylinders 72A and 72B is positioned at a predetermined initial position in the cylinder body 72a, the dog rings 51 and 52 are positioned at the neutral positions. The piston 72c is biased to the initial position by a biasing force of a return spring. A second end surface of the piston 72c receives pressure of pressure oil, and the piston 72c moves against the biasing force, so that the dog rings 51 and 52 are displaced from the neutral position to the engaged position.

The third and fourth cylinders 72C and 72D correspond to the third and fourth dog rings 53 and 54 of the three-position type, respectively, and are of a both-rod type. The cylinders 72C and 72D have a counter rod 72d2 extending from the second end surface of the piston 72c to the side opposite to the operation rod 72d1, and a pressure receiving area of the piston 72c is equal between the first end surface and the second end surface. A biasing force in the axial direction is applied to both of the end surfaces of the piston 72c, and the piston 72c is biased to the initial position set at the center in the axial direction inside the cylinder body 72a. When the piston 72c is positioned at the initial position, the dog rings 53 and 54 are positioned at the neutral position. The second end surface of the piston 72c receives pressure of the pressure oil, and the piston 72c moves from the initial position to a first side in the axial direction, so that the dog rings 53 and 54 are displaced from the neutral position to the first engaged position. The first end surface of the piston 72c receives pressure of the pressure oil, and the piston 72c moves from the neutral position to a second side in the axial direction, so that the dog rings 53 and 54 are displaced from the neutral position to the second engaged position.

Referring also to FIG. 4, the controller 80 is connected to an operation sensor 91 that detects operation of the dog rings 51 to 54 and a rotation speed sensor 94 that detects a rotation speed difference between the dog rings 51 to 54 and a power transmission gear (in particular, the driving gears 31 and 33 to 37).

The operation sensor 91 includes position sensors 92A to 92D of a contact-type that are in contact with an operation portion that moves in conjunction with the dog rings 51 to 54 and detect the position of the dog rings 51 to 54. The "operation portion" constitutes a part of the switching mechanism 70, and includes, for example, the piston 72c, the operation rod 72d1, and the shift members 75A to 75D. The dog rings 51 to 54 operate independently of one another. For this reason, the position sensors 92A to 92D are provided as many as the dog rings 51 to 54 (for example, four), and correspond to the dog rings 51 to 54 on a one-to-one basis.

In the present embodiment, each of the position sensors 92A to 92D is provided in a corresponding one of the cylinders 72A to 72D, and detects whether or not the corresponding piston 72c is positioned at the initial position. When the piston 72c is positioned at the initial position, each of the position sensors 92A to 92D comes into contact with an outer peripheral surface of the piston 72c and outputs an ON signal. When the piston 72c is displaced from the initial position, each of the position sensors 92A to 92D is separated from the piston 72c and outputs an OFF signal.

Regarding the third and fourth cylinders 72C and 72D corresponding to the third and fourth dog rings 53 and 54 of the three-position type, respectively, each of the position sensors 92A to 92D outputs the same OFF signal in a case where the piston 72c is displaced from the initial position to the first engaged position or to the second engaged position.

The operation sensor 91 includes pressure sensors 93C and 93D that detect pressure of the pressure oil supplied to at least one of the two ports 72b of each of the third and fourth cylinders 72C and 72D. In the present embodiment, one of the pressure sensors 93C and 93D is provided for each of these two cylinders 72C and 72D. For example, the pressure sensors 93C and 93D detect pressure in an oil passage connected to the port 72b communicating with an oil chamber that the second end surface of the piston 72c faces. Under a situation where the position sensors 92A to 92D output the OFF signal, if the pressure shows a high value exceeding a first predetermined value, this shows that the piston 72c moves to the first side in the axial direction, and the corresponding dog rings 53 and 54 are displaced from the neutral position to the first engaged position of the two engaged positions. If the pressure shows a low value below a second predetermined value, this shows that the piston 72c moves to the second side in the axial direction, and the corresponding dog rings 53 and 54 are displaced from the neutral position to the second engaged position of the two engaged positions.

The rotation speed sensor 94 may include, for example, a set of an upstream rotation speed sensor 95 that detects a rotation speed of the drive source output shaft 9a (see FIG. 2) and a downstream rotation speed sensor 96 that detects a rotation speed of the final shaft 14a (see FIG. 2). The dog rings 51 to 54 are rotating bodies on the drive source 9 side, and the power transmission gear (driving gears 31 and 33 to 37) are rotating bodies on the wheel 2 side. A rotation speed of the dog rings 51 to 54 can be acquired by multiplying a detection result of the upstream rotation speed sensor 95 by a speed ratio from a detection target (here, the drive source output shaft 9a) of the upstream rotation speed sensor 95 to the dog rings 51 to 54. A rotation speed of the power transmission gear (driving gears 31 and 33 to 37) can be acquired by multiplying a detection result of the downstream rotation speed sensor 96 by a speed ratio from a detection target (here, the final shaft 14a) of the downstream rotation speed sensor 96 to each gear. Since the clutches 12A and 12B are interposed between the drive source 9 and the dog rings 51 to 54, a state of the clutches 12A and 12B may be considered when a rotation speed of the dog rings 51 to 54 is estimated.

A sensor that detects a rotation speed of the drive source output shaft 9a is originally mounted on a vehicle for controlling the drive source 9. A sensor that detects a rotation speed of the final shaft 14a is originally mounted on a vehicle for detecting or estimating a vehicle speed. Since such an existing sensor is used as the rotation speed sensor 94, simplification of the configuration of the control system 100 is achieved. Note that, in order to accurately detect a rotation speed of the dog rings 51 to 54 regardless of a state of the clutches 12A and 12B, the upstream rotation speed sensor 95 may include a sensor that detects a rotation speed of the first input shaft 21 and a sensor that detects a rotation speed of the second input shaft 22. The downstream rotation speed sensor 96 may be a sensor that detects a rotation speed of a rotation shaft other than the final shaft 14a, for example, the counter shaft 24 or the output shaft 25.

Referring to FIG. 4, the controller 80 includes a receiving unit 81, a switching controller 82, and a storage unit 83. A function implemented by a constituent described in the present description may be implemented in circuitry or processing circuitry, including a general purpose processor, an application specific processor, an integrated circuit, application specific integrated circuits (ASICs), a central processing unit (CPU), a conventional circuit, and/or a combination of these programmed to implement the described function. A processor includes a transistor and other circuits, and is regarded as circuitry or processing circuitry. The processor may be a programmed processor that executes a program stored in a memory. In the present description, circuitry, a means, or a unit is hardware programmed to implement a described function or hardware executing the function. The hardware may be any hardware disclosed in the present description, or any hardware programmed to implement or known to execute the described function. In a case where the hardware is a processor regarded as a type of circuitry, the circuitry, means, or unit is a combination of hardware and software used to configure the hardware and/or the processor.

The receiving unit 81 receives a detection result output from various sensors. The various sensors include the operation sensor 91 and the rotation speed sensor 94 described above. Other than the above, the various sensors include a sensor that detects information indicating an acceleration or deceleration request of a driver, such as an acceleration operation amount sensor 97 that detects an operation amount of an acceleration operation element (for example, an accelerator pedal) by the driver. The storage unit 83 temporarily or permanently stores information necessary for processing performed by the switching controller 82.

The switching controller 82 determines a switching timing of a power transmission state, in other words, whether or not switching of a power transmission state is necessary based on a detection result received by the receiving unit 81. When determining that the switching timing has come, the switching controller 82 determines the target gear position.

The switching controller 82 gives a switching command to the switching mechanism 70 in order to switch a power transmission state from the pre-switching gear position to the target gear position according to the determined target gear position. In other words, in order to switch the pre-switching dog clutch from the engaged state to the neutral state and switch the target dog clutch 55 from the neutral state to the engaged state, a fluid pressure adjustment command for adjusting fluid pressure is provided to at least one of the valves 73A to 73C. Specifically, both the switching command and the fluid pressure adjustment command are electric signals supplied to a solenoid of the valves 73A to 73C. Furthermore, in the present embodiment, since the transmission 13 is a DCT, a state of the first and second clutches 12A and 12B is switched in the switching of a power transmission state.

Next, the switching controller 82 determines whether the target dog clutch 55 has been brought into (is in) the engaged state. In this determination, the switching controller 82 refers to a detection result of the operation sensor 91 and the rotation speed sensor 94 received by the receiving unit 81. In a case where the target dog clutch 55 is determined not to be in the engaged state, the switching controller 82 moves the target dog ring 50 in the axial direction to the side opposite to the target gear 30 side. That is, the switching controller 82 once returns the target dog ring 50 to the neutral position. After the above, the switching controller 82 retries the movement in the axial direction of the target dog ring 50 toward the target gear 30 side. That is, the switching controller 82 again displaces the target dog ring 50 from the neutral position to the engaged position. The return to the neutral position and the re-movement to the engaged position of the target dog ring 50 are also realized by giving a switching command to the switching mechanism 70 or a fluid pressure adjustment command to the valves 73A to 73C. Note that the switching controller 82 may change a phase of the target dog ring 50 with respect to the target gear 30 in a case where the target dog clutch 55 is determined not to be in the engaged state. This change in phase is performed after the target dog clutch 55 is determined not to be in the engaged state and before movement in the axial direction of the target dog ring 50 toward the target gear 30 side is retried.

Figure 5A:
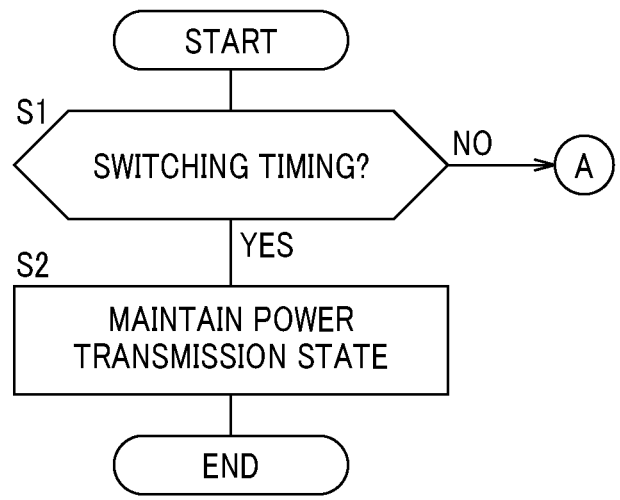
FIGS. 5A and 5B are flowcharts illustrating a control method executed by the control system.
Figure 5B:
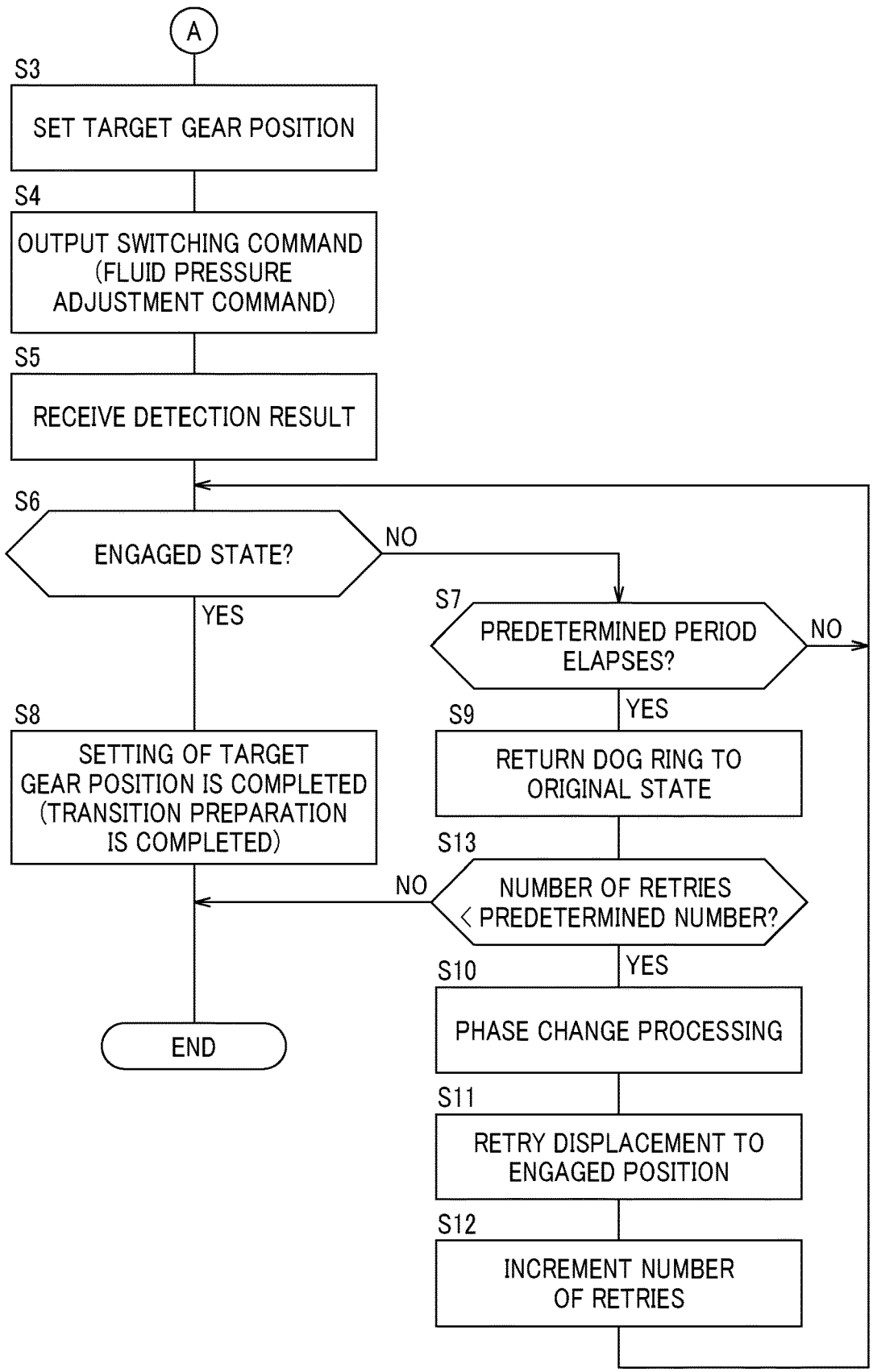

A method for controlling the power transmission mechanism 10 according to the present embodiment executed by the control system 100 will be described with reference to flowcharts of FIGS. 5A and 5B and operation diagrams of FIGS. 6A to 6D although partially overlapping with the above description regarding the configuration of the control system 100.

First, the switching controller 82 determines whether or not a switching timing of a power transmission state has arrived (Step S1). While the switching timing does not arrive (S1: NO), a current power transmission state is maintained (Step S2). When the switching time arrives (S1: YES), the target gear position is set (Step S3).

Figure 6A:
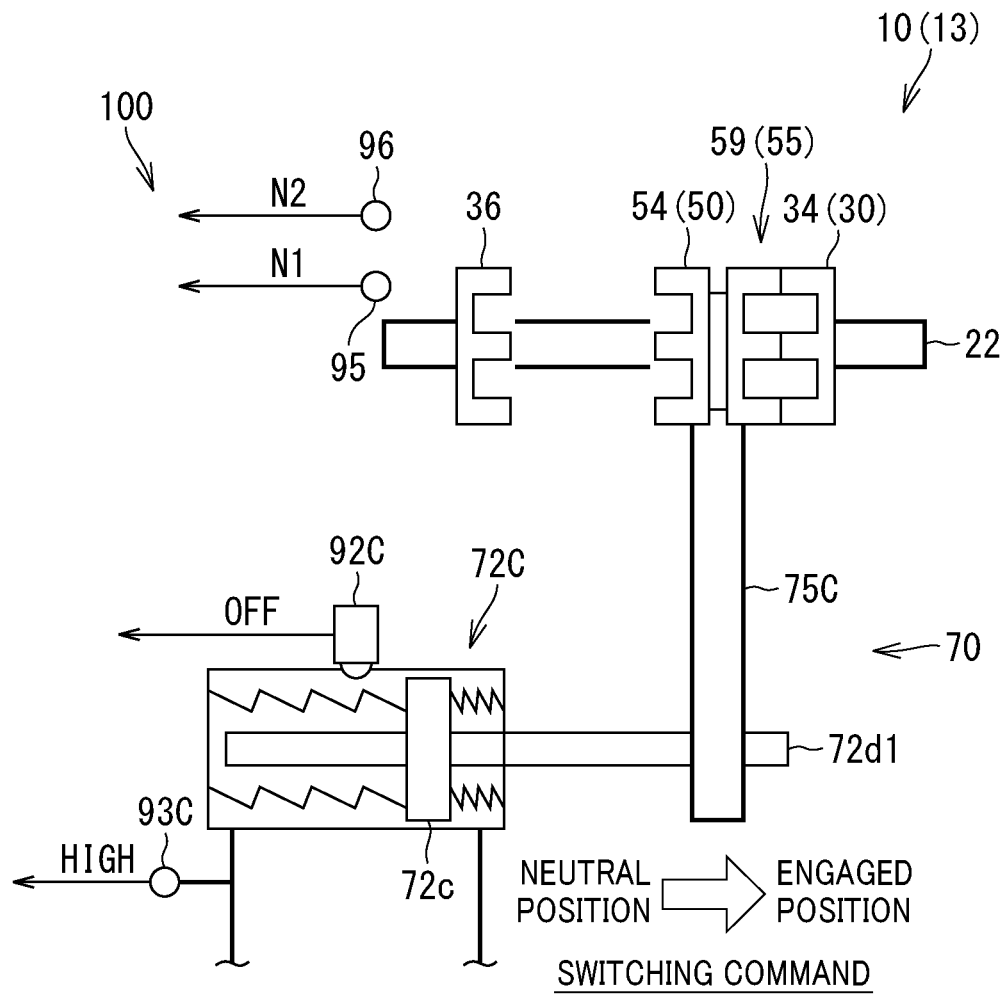
FIGS. 6A to 6D are diagrams illustrating operation of a target dog clutch.

As also illustrated in FIG. 6A, the switching controller 82 gives a switching command to the switching mechanism 70 so that the pre-switching dog clutch becomes in the non-engaged state and the target dog clutch 55 becomes in the engaged state (that is, the previous dog ring is displaced from the engaged position to the neutral position and the target dog ring 50 is displaced from the neutral position to the engaged position) (Step S4). In other words, a fluid pressure adjustment command is given to the valves 73A to 73C of the switching mechanism 70. In still other words, an electric signal is supplied to a solenoid of the valves 73A to 73C so that a power transmission state is switched from the pre-switching gear position to the target gear position.

The receiving unit 81 receives a detection result output from the operation sensor 91 and the rotation speed sensor 94 (Step S5). Based on a detection result received by the receiving unit 81, the switching controller 82 determines whether the target dog clutch 55 is brought into the engaged state (Step S6). When the target dog clutch 55 is determined to be brought into the engaged state until a predetermined period (see Step S7) elapses after the switching command is given (S6: YES), the processing of switching the power transmission state ends. At this time, the setting of the pre-switching gear position is released, and the setting of the target gear position is completed (Step S8). In a case where the transmission 13 is a DCT, at this time, preparation for transition to the target gear position may be completed. Note that the "predetermined period" in the determination processing of Step S7 is, for example, 0.2 to 0.5 seconds.

The switching controller 82 determines whether or not the position sensors 92A to 92D corresponding to the target dog ring 50 output an OFF signal. In a case of an ON signal, the target dog ring 50 is not displaced from the neutral position in the first place. When the target dog ring 50 is of the three-position type, the switching controller 82 determines whether a detection result of the pressure sensors 93C and 93D corresponding to the target dog ring 50 is a high value or a low value, and determines whether or not the detection result matches the target gear position. In a case where the target dog ring 50 is recognized to be displaced from the neutral position to an appropriate engaged position corresponding to the target gear position from a detection result of the operation sensors 91, the switching controller 82 determines whether or not a rotation speed difference is equal to or less than a predetermined value based on a detection result of the rotation speed sensor 94. In a case where the predetermined value is exceeded, the switching controller 82 determines that the engaged state is not established.

Figure 6B:
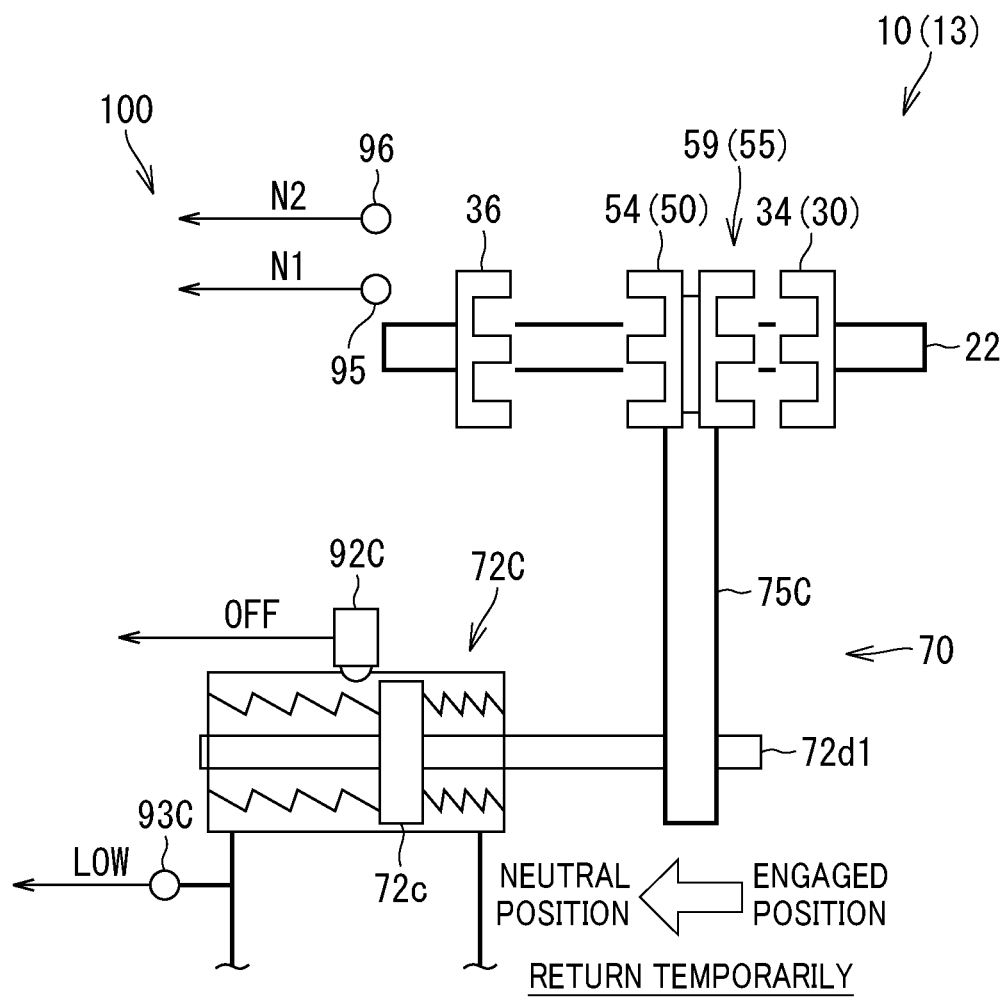

In a case where a non-engaged state of the target dog clutch 55 continues for a predetermined period after the switching command is provided (S6: NO AND S7: YES), the switching controller 82 provides a switching command to the switching mechanism 70 to return the dog clutch to the original state (Step S9). The dog clutch to be returned to the original state includes at least the target dog clutch 55. For this reason, as also illustrated in FIG. 6B, the target dog ring 50 once returns from the engaged position to the neutral position. The dog clutch to be returned to the original state may include the pre-switching dog clutch. In this case, the pre-switching dog ring returns from the neutral position to the engaged position, and the pre-switching gear position is reset once.

Figure 6C:
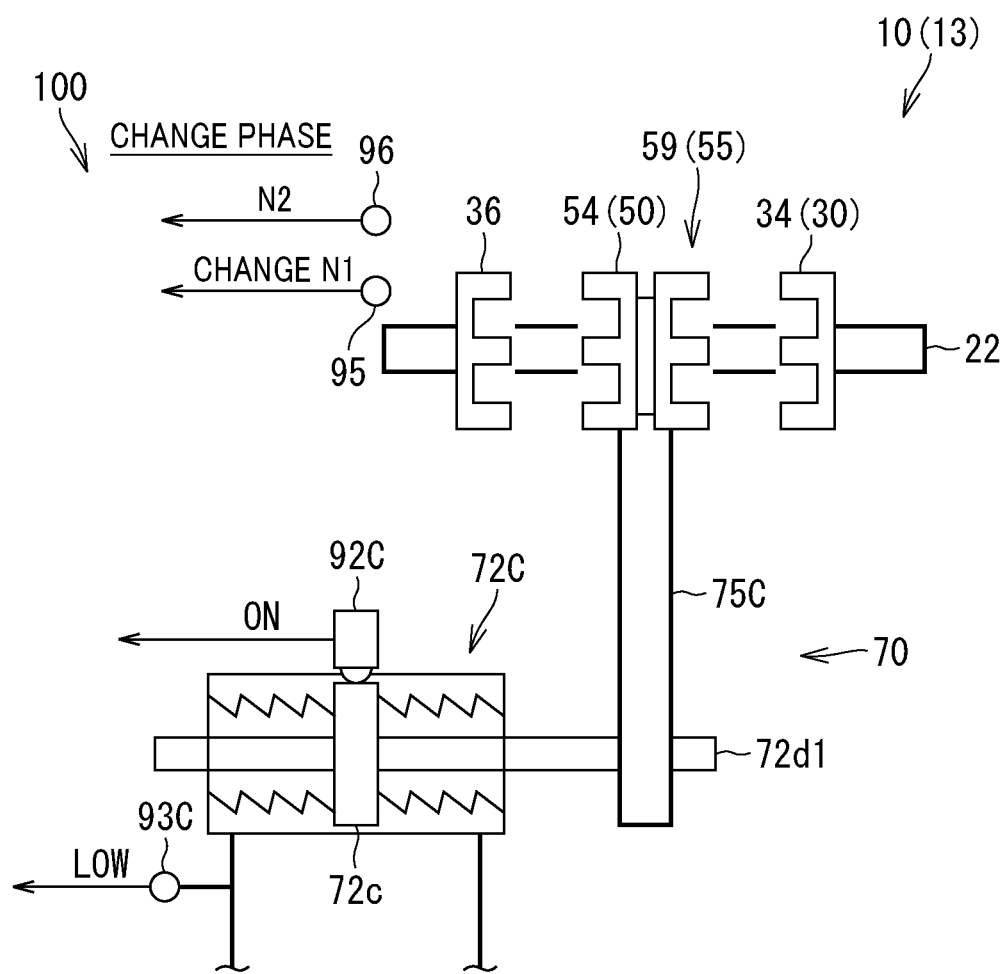

Next, the switching controller 82 performs phase change processing for changing a phase of the target dog ring 50 with respect to the target gear 30 (Step S10). Referring also to FIG. 6C, in the phase change processing, the phase may be changed passively or actively. The phase change processing may start while the dog ring is being returned (that is, from before completion of the returning).

Regarding the passive control, due to a difference in moments of inertia between the target dog ring 50 and the target gear 30, and the like, the phase should be naturally changed as time elapses without further operation. Therefore, in the phase change processing (Step S9), when the target dog ring 50 returns to the neutral position, passive control in which this state (that is, a state in which the corresponding position sensors 92A to 92D output an ON signal) is maintained for a predetermined period may be simply performed.

Regarding the active control, the switching controller 82 may change a rotation speed of a rotating body on the drive source 9 side among the target dog rings 50 and the target gears 30. In the present embodiment, in any of four of the dog clutches 56 to 59, the dog rings 51 to 54 are rotating bodies on the drive source 9 side, and the power transmission gears (driving gears 31 and 33 to 37) are rotating bodies on the wheel 2 side. A change in a rotation speed N1 of the dog rings 51 to 54 (rotating bodies on the drive source 9 side) may be either increasing or decreasing. Increasing and decreasing may be switched between at the time of shift-up and at the time of shift-down. In a case where the drive source 9 includes an engine, the opening degree of an electronic throttle valve, a fuel injection amount, or an ignition timing may be changed in order to change the rotation speed N1. The degree of slippage of the clutches 12A and 12B connected to the rotation shafts 21 and 22 to which the target dog ring 50 is fixed may be changed. By the above, the rotation speed N1 of the rotating body on the drive source 9 side can be easily made different from a rotation speed N2 of the rotating body on the wheel 2 side, and the phase is easily shifted.

Figure 6D:
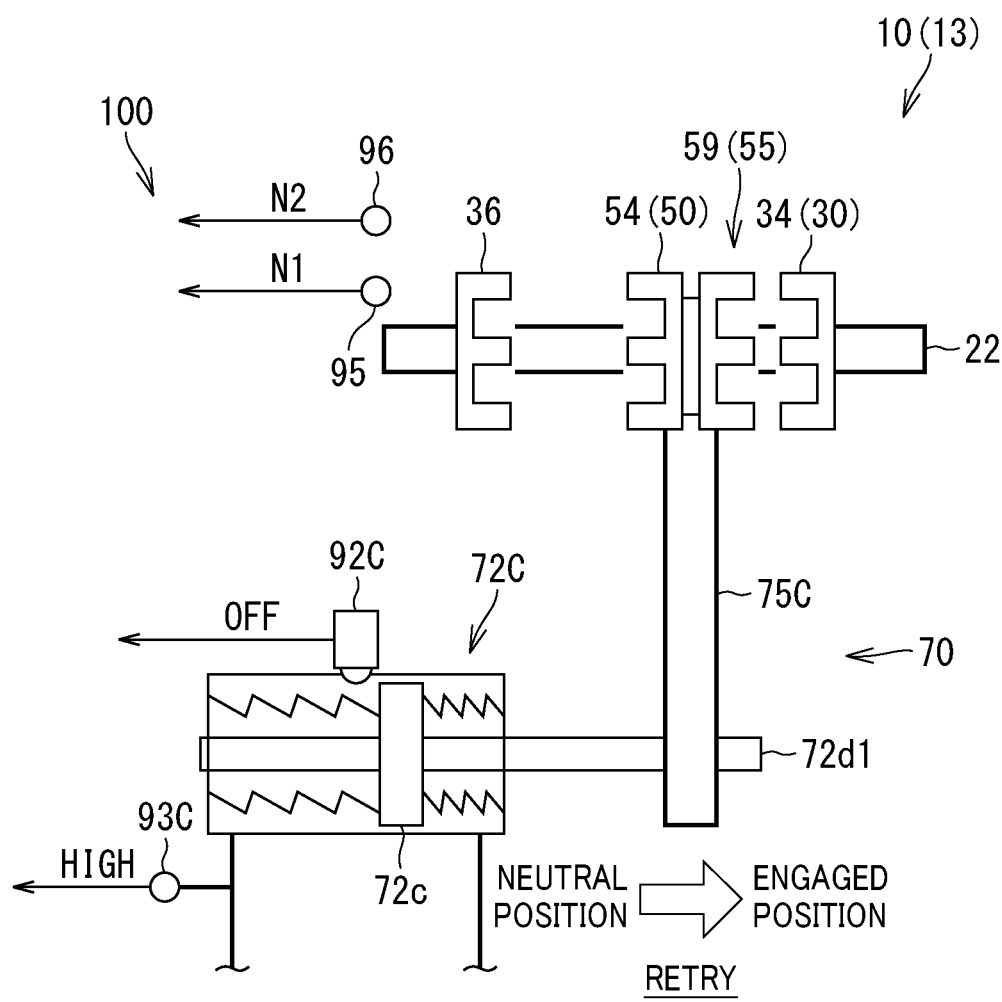

Next, as also illustrated in FIG. 6D, the switching controller 82 gives a switching command to the switching mechanism 70 to displace the target dog ring 50 from the neutral position to the engaged position again (Step S11). The switching controller 82 counts up the number of retries stored in the storage unit 83 by one (Step S12).

The switching controller 82 again determines whether or not the target dog clutch 55 is in the engaged state (Step S6). When the target dog clutch 55 is determined to be in the engaged state (S6: YES), the processing of switching the power transmission state is ended. In a case where the non-engaged state of the target dog clutch 55 continues for a predetermined period after the switching command is given (S6: NO AND S7: YES), the switching controller 82 proceeds to Step S9 and returns the target dog ring 50 to the original state so as to retry transition to the target gear position again. Here, the switching controller 82 determines whether or not the number of retries is less than a predetermined number (for example, two) (Step S13). When the predetermined number is not reached (S13: YES), the processing proceeds to Step S10. The switching controller 82 performs the phase change processing (Step S10), displaces the target dog clutch 55 to the engaged position again (Step S11), and increments the number of retries (Step S12).

When the number of retries reaches the predetermined number (S13: NO), transition to the target gear position is abandoned. At the time of the abandonment, resetting of the pre-switching gear position may be attempted, or a gear position that can be set as long as the second clutch 12B can operate even when all the dog clutches 56 to 59 are in the non-engaged state, that is, a second gear position may be temporarily set. Further, display indicating that a failure occurs in the power unit 3 may be displayed on an instrument panel.

The control system 100 according to the present embodiment includes the power transmission mechanism 10 having the rotation shafts 21 to 25, the power transmission gears 31 and 33 to 37 rotatably fitted to the rotation shafts 21 to 25 and locked in the axial direction, the dog rings 51 to 54 slidably fitted in the axial direction and locked in the circumferential direction to the rotation shafts 21 to 25, and the dog clutches 56 to 59 provided in the dog rings 51 to 54 and the power transmission gears 31 and 33 to 37, the switching mechanism 70 that moves the dog rings 51 to 54 in the axial direction to switch a power transmission state, and the switching controller 82 that controls operation of the switching mechanism 70. In a case of giving a switching command for switching a power transmission state by moving the dog rings 51 to 54 (in particular, the target dog ring 55) to the power transmission gears 31 and 33 to 37 side (in particular, the target gear 30 side) in the axial direction, the switching controller 82 determines whether the dog clutches 56 to 59 (in particular, the target dog clutch 50) are brought into the engaged state. In a case where the dog clutches 56 to 59 (in particular, the target dog clutch 55) is determined not to be in the engaged state, the dog rings 51 to 54 (in particular, the target dog ring 50) is moved to the side opposite to the power transmission gears 31 and 33 to 37 side (in particular, the target gear 30 side) in the axial direction. After the above, the switching controller 82 retries movement of the dog rings 51 to 54 (in particular, the target dog ring 50) to the power transmission gears 31 and 33 to 37 side (in particular, the target gear 30 side).

When the target dog clutch 55 is determined not to be in the engaged state, the target dog ring 50 is moved to the side opposite to the target gear 30 side, and then moved again to the target gear 30 side. By the above, it is possible to prevent the non-engaged state from being continued when two elements of the engagement set of the target dog clutch 55 collide with each other in the axial direction.

The switching mechanism 70 includes the shift members 75A to 75D that are engaged with the dog rings 51 to 54 and move the dog rings 51 to 54 in the axial direction of the rotation shaft, the pump 71 that supplies fluid pressure, the cylinders 72A to 72D that move the shift members 75A to 75D in the axial direction of the rotation shafts 21 to 25 according to liquid pressure supplied by the pump 71, and the valves 73A to 73D that adjust fluid pressure supplied to the cylinders 72A to 72D. By giving a fluid pressure adjustment command to the valves 73A to 73C, the switching controller 82 moves the shift members 75A to 75D and moves the dog rings 51 to 54 in the axial direction of the rotation shafts 21 to 25.

When the fluid pressure adjustment command is given to the valves 73A to 73C, the dog rings 51 to 54 are moved in the axial direction of the rotation shafts 21 to 25. In a case where the shift members 75A to 75D are moved using fluid pressure, it is difficult to grasp movement of the shift members 75A to 75D as compared with a case where the shift members 75A to 75D are mechanically moved by a cam mechanism using a shift drum. However, since the engaged state of the dog clutches 56 to 59 is determined, continuation of the non-engaged state can be prevented.

The control system 100 includes the operation sensor 91 that detects operation of the dog rings 51 to 54. The switching controller 82 determines whether the dog clutches 56 to 59 (in particular, the target dog clutch 55) is in the engaged state based on operation of the dog rings 51 to 54 detected by the operation sensor 91.

The engaged state of the dog clutches 56 to 59 is determined based on operation of the dog rings 51 to 54 which is a premise of engagement of the dog clutches 56 to 59. It is possible to prevent an erroneous determination that the dog clutches 56 to 59 are in the engaged state when movement of the dog rings 51 to 54 is not sufficient.

The switching mechanism 70 includes an operation portion that operates in conjunction with the dog rings 51 to 54. The operation sensor 91 is the position sensors 92A to 92D of a contact-type that detect the position of the dog rings 51 to 54 by contacting the operation portion. Note that an operating position includes, for example, the piston 72c, the operation rod 72d1, and the shift members 75A to 75D.

The position of the dog rings 51 to 54 can be easily and inexpensively detected by the position sensors 92A to 92D of a contact-type, and the engaged state of the dog clutches 56 to 59 can be easily determined.

The control system 100 includes the rotation speed sensor 94 that detects a rotation speed difference between the dog rings 51 to 54 (in particular, the target dog ring 50) and the power transmission gears 31 and 33 to 37 (in particular, the target gear 30). The switching controller 82 determines whether the dog clutches 56 to 59 (in particular, the target dog clutch 55) is in the engaged state based on a rotation speed difference detected by the rotation speed sensor 94.

Here, when the target dog clutch 55 is in the engaged state, since the target dog ring 50 and the target gear 30 rotate in synchronization, a rotation speed difference should be zero or a value close to zero. In the present embodiment, the engaged state of the target dog clutch 55 is determined based on a rotation speed difference between the target dog ring 50 and the target gear 30. It is possible to prevent an erroneous determination that the target dog clutch 55 is in the engaged state when the target dog ring 50 moves from the neutral position and the target dog clutch 55 is in the non-engaged state.

The switching controller 82 determines whether the dog clutches 56 to 59 (in particular, the target dog clutch 55) is in the engaged state based on operation of the dog rings 51 to 54 (in particular, the target dog ring 50) detected by the operation sensor 91 and a rotation speed difference detected by the rotation speed sensor 94.

The engaged state of the target dog clutch 55 is determined based not only on operation of the target dog ring 50 but also on a rotation speed difference between the target dog ring 50 and the target gear 30. As compared with a case where the engaged state of the target dog clutch 55 is determined based only on operation of the target dog ring 50, the engaged state of the dog clutches 56 to 59 can be determined with high accuracy.

In a case where the dog clutches 56 to 59 (in particular, the target dog clutch 55) are determined not to be in the engaged state after giving a switching command to move the dog rings 51 to 54 (in particular, the target dog ring 50) to the power transmission gears 31 and 33 to 37 side (in particular, the target gear 30 side), the switching controller 82 changes a phase of the dog rings 51 to 54 (in particular, the target dog ring 50) and the power transmission gears 31 and 33 to 37 (in particular, the target gear 30).

When the target dog clutch 55 is not engaged, a phase of the target dog ring 50 with respect to the target gear 30 is changed. Therefore, when the target dog ring 50 is moved again to the target gear 30 side, two elements of an engagement set provided in the target dog ring 50 and the target gear 30 can be easily engaged.

The control system 100 includes the drive source 9 and the drive wheels 2F and 2R to which power from the drive source 9 is transmitted through the dog rings 51 to 54 and the power transmission gears 31 and 33 to 37. When changing a phase between the dog rings 51 to 54 (in particular, the target dog ring 50) and the power transmission gears 31 and 33 to 37 (in particular, the target gear 30), the switching controller 82 changes a rotation speed of one of the dog rings 51 to 54 (in particular, the target dog ring 50) and the power transmission gears 31 and 33 to 37 (in particular, the target gear 30) provided on the drive source 9 side.

A rotation speed of the rotating body on the drive source 9 side among the target dog rings 50 and the target gears 30 is changed. It is easier to change a phase between the target dog ring 50 and the target gear 30 than in the opposite case.

Although an embodiment is described above, the above configuration can be appropriately added, deleted, and/or changed within the scope of the gist of the present invention.

The exemplified type of the transmission 13 is merely one example. The number of clutches may be one. However, it is advantageous if the control system according to the present embodiment is applied to a transmission not including a synchromesh mechanism.

The control system 100 and the control method executed by the control system 100 are also applicable to a vehicle other than the utility vehicle 1, for example, a motorcycle.

What is claimed is:

1. A system for controlling a power transmission mechanism, the system comprising:
   a power transmission mechanism including a rotation shaft, a power transmission gear rotatably fitted to the rotation shaft and locked to the rotation shaft with respect to an axial direction, a dog ring slidably fitted to the rotation shaft so as to be slidable in the axial direction and locked to the rotation shaft with respect to a circumferential direction, and a dog clutch in the dog ring and the power transmission gear;
   a switching mechanism configured to move the dog ring in the axial direction to switch a power transmission state; and
   a switching controller configured to control an operation of the switching mechanism, and the switching controller being further configured to:
   determine whether the dog clutch is in an engaged state when a switching command is given to the switching mechanism to switch the power transmission state by moving the dog ring in the axial direction to a side of the power transmission gear, and
   after determining that the dog clutch is not in the engaged state, control the switching mechanism to move the dog ring in the axial direction to a side opposite to the power transmission gear, and then control the switching mechanism to retry movement of the dog ring to the side of the power transmission gear.

2. The system for controlling a power transmission mechanism according to claim 1, wherein the switching mechanism includes:
   a shift member configured to engage with the dog ring to move the dog ring in the axial direction;
   a pump configured to supply fluid pressure;
   a piston configured to move the shift member in the axial direction in accordance with the fluid pressure supplied by the pump; and
   a valve configured to adjust the fluid pressure supplied to the piston, and
   wherein the switching controller is configured to generate a fluid pressure adjustment command to the valve for adjusting the fluid pressure to cause the shift member to be moved and thereby cause the dog ring to be moved in the axial direction.

3. The system for controlling a power transmission mechanism according to claim 1, further comprising an operation sensor configured to detect an operation of the dog ring,
   wherein the switching controller is configured to determine whether the dog clutch is in the engaged state based on the operation of the dog ring detected by the operation sensor.

4. The system for controlling a power transmission mechanism according to claim 3, wherein:
   the switching mechanism includes an operation portion configured to operate in conjunction with the dog ring, and
   the operation sensor is a contact position sensor to be brought into contact with the operation portion to detect a position of the dog ring.

5. The system for controlling a power transmission mechanism according to claim 3, further comprising a rotation speed sensor configured to detect a rotation speed difference between the dog ring and the power transmission gear,
   wherein the switching controller is configured to determine whether the dog clutch is in the engaged state based on the operation of the dog ring detected by the operation sensor and the rotation speed difference detected by the rotation speed sensor.

6. The system for controlling a power transmission mechanism according to claim 1, further comprising a rotation speed sensor configured to detect a rotation speed difference between the dog ring and the power transmission gear,
   wherein the switching controller is configured to determined whether the dog clutch is in the engaged state based on the rotation speed difference detected by the rotation speed sensor.

7. The system for controlling a power transmission mechanism according to claim 1, wherein the switching controller is configured to change a phase of the dog ring with respect to the power transmission gear when the dog clutch is determined not to be in the engaged state.

8. The system for controlling a power transmission mechanism according to claim 7, further comprising:
   a drive source; and
   a drive wheel to which power from the drive source is transmitted through the dog ring and the power transmission gear,
   wherein the switching controller is configured to change a rotation speed of one of the dog ring and the power transmission gear located closer to the drive source when changing the phase.

9. A method for controlling a power transmission mechanism including a rotation shaft, a power transmission gear rotatably fitted to the rotation shaft and locked to the rotation shaft with respect to an axial direction, a dog ring slidably fitted to the rotation shaft so as to be slidable in the axial direction and locked to the rotation shaft with respect to a circumferential direction, and a dog clutch in the dog ring and the power transmission gear, the method comprising:
   determining whether the dog clutch is in an engaged state when a switching command is given to switch a power transmission state by moving the dog ring in the axial direction to a side of the power transmission gear; and
   after determining that the dog clutch is not in the engage state, moving the dog ring in the axial direction to a side opposite to the power transmission gear, and then retrying movement of the dog ring to the side of the power transmission gear.

10. A utility vehicle comprising:

a rotation shaft;

a power transmission gear rotatably fitted to the rotation shaft and locked to the rotation shaft with respect to an axial direction;

a dog ring slidably fitted to the rotation shaft so as to be slidable in the axial direction and locked to the rotation shaft with respect to a circumferential direction;

a dog clutch in the dog ring and the power transmission gear;

a shift member engaged with the dog ring and configured to move the dog ring in the axial direction; and a controller configured to control movement of the shift member, the controller being further configured to:
- determine whether the dog clutch is in an engaged state when a switching command is given to switch a power transmission state by moving the dog ring in the axial direction to a side of the power transmission gear, and
- after determining that the dog clutch is not in the engaged state, control the shift member to move the dog ring in the axial direction to a side opposite to the power transmission gear, and then retry movement of the dog ring to the side of the power transmission gear.

* * * * *